(12) United States Patent
Liang (10) Patent No.: US 6,305,698 B1
(45) Date of Patent: Oct. 23, 2001

(54) SKATING SCOOTER (76) Inventor: Shan-Kwai Liang, Room 5, 6th Floor, No. 52, Chung-Chin First Street, Zeng-Der Shiang, Tainan Hsieh (TW)

( * ) Notice: Subject to any disclaimer, the term of this patent is extended or adjusted under 35 U.S.C. 154(b) by 0 days.

(21) Appl. No.: 09/616,677

(22) Filed: Jul. 14, 2000

(51) Int. Cl.[7] .................................................. B62B 7/00
(52) U.S. Cl. ............................... 280/87.041; 280/87.05; 280/655.1
(58) Field of Search .......................... 280/87.041, 87.05, 280/63, 287, 200, 270, 263, 639, 641, 655.1; 403/100, 98, 112

(56) References Cited

U.S. PATENT DOCUMENTS

| | | | | |
|---|---|---|---|---|
| 6,120,044 | * | 9/2000 | Tsai | 280/87.05 |
| 6,158,751 | * | 12/2000 | Wu et al. | 280/87.041 |
| 6,173,976 | * | 1/2001 | Lee | 280/87.05 |
| 6,182,988 | * | 2/2001 | Wu | 280/87.05 |
| 6,206,387 | * | 3/2001 | Tsai | 280/87.041 |
| 6,244,605 | * | 6/2001 | Liu | 280/87.041 |

* cited by examiner

*Primary Examiner*—Brian L. Johnson
*Assistant Examiner*—Tony Winner
(74) *Attorney, Agent, or Firm*—Rosenberg, Klein & Lee (57) ABSTRACT

A skating scooter includes a deck with a rear wheel and a handlebar assembly pivotally connected to two protrusions on the deck. A front wheel is connected to a lower end of the handlebar assembly and a handlebar is connected to a top of the handlebar assembly. The handlebar has two pivotably grip portions. A bolt and a pin respectively extend through the two protrusions and are engaged with a groove in the handlebar assembly. The handlebar assembly can be pivoted toward the deck by respectively removing the bolt and the pin from the groove in the handlebar assembly.

7 Claims, 10 Drawing Sheets

SKATING SCOOTER

FIELD OF THE INVENTION

The present invention relates to a skating scooter that has a retractable and foldable handlebar assembly, and the handlebar can be folded to become a compact size which is convenient for storage.

BACKGROUND OF THE INVENTION

Figure 11:
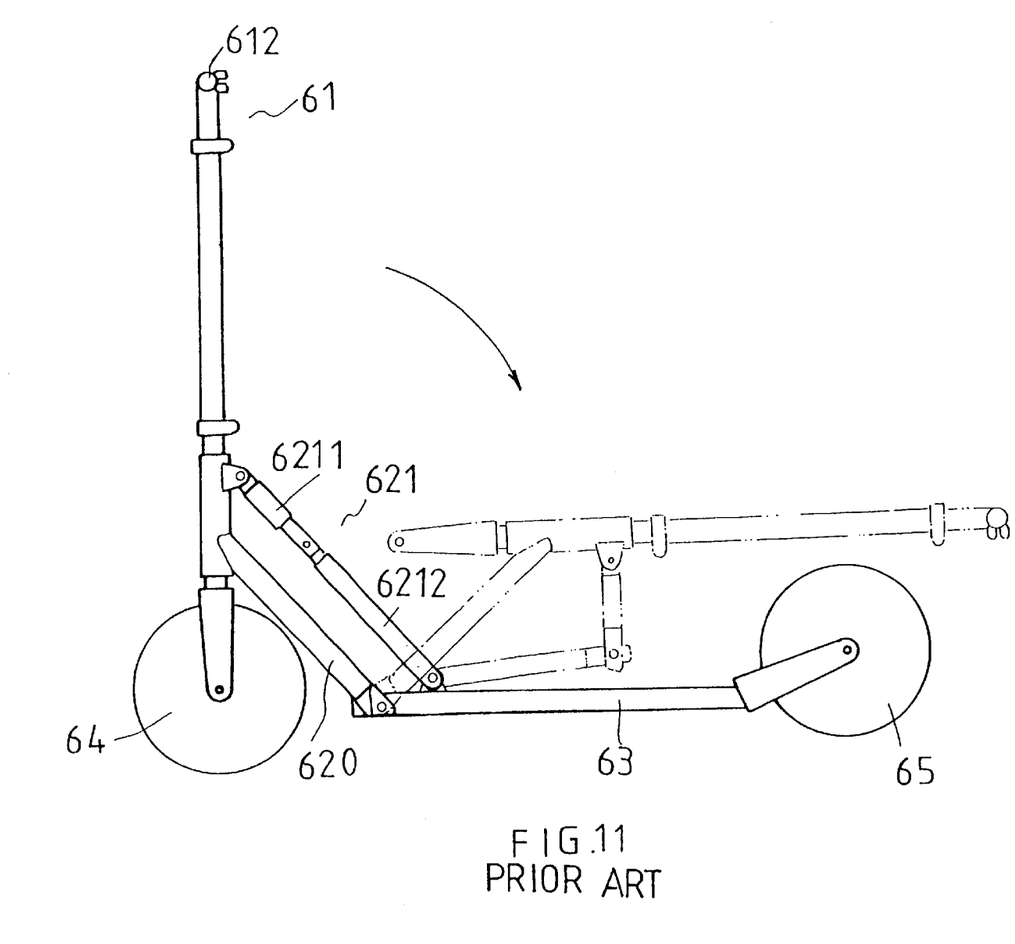
FIG. 11 shows a conventional skating scooter.

A conventional is shown in FIG. 11 and generally includes a deck 63 with a rear wheel 65 and a connection tube 620 connected between a front end of the deck 63 and a handlebar assembly 61. A front wheel 64 is connected to a lower end of the handlebar assembly 61 and a handlebar 612 is connected to a top of the handlebar assembly. A folding device 621 is connected between the deck 63 and the handlebar assembly 611, and includes two sections 6211, 6212 which are pivotally connected with each other. The handlebar assembly 61 can be folded toward the deck 63 to reduce the space that the scooter occupies. However, the handlebar assembly 61 has a fixed length so that it may not be satisfied by different users. Besides, the handlebar 612 is in a form of T-shaped structure and which is wide and not advantageous to be stored.

The present invention intends to provide a skating scooter that has foldable handlebar and retractable handlebar stem so as to let the folded skating scooter occupy only a small space.

SUMMARY OF THE INVENTION

In accordance with one aspect of the present invention, there is provided a skating scooter and comprising a deck having a rear wheel connected to a rear end of the deck and a recess defined in a front end of the deck. A first protrusion and a second protrusion respectively extend from a top of the deck. The first protrusion has a first passage defined therethrough and the second protrusion has a threaded hole defined therethrough. A handlebar assembly has a base member engaged with the recess and pivotally between the first protrusion and the second protrusion. A retractable handlebar stem rotatably extends through a third section of the base member and a front wheel is connected to a lower end of the handlebar stem, and a handlebar comprising two grip portions is connected to a top of the handlebar stem. The handlebar stem has a groove defined in an outer periphery thereof and the groove is located within the second passage in the base member. A pin is movably inserted into the first passage and a head is connected to a first end of the pin and a flange is connected to a second end of the pin. A spring is mounted to the pin and biased between the head and the flange. The head of the pin is engaged with the groove of the handlebar stem. A bolt is engaged with the threaded hole and engaged with the groove of the handlebar stem.

The primary object of the present invention is to provide a skating scooter which has a foldable handlebar assembly and a foldable handlebar.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Referring to FIGS. 1 to 5, the skating scooter of the present invention comprises a deck 1 having an aperture defined in the rear end of the deck 1 and a rear wheel 100 is engaged with the aperture. A recess 41 is defined in a front end of the deck 1 and a first protrusion 351 and a second protrusion 352 respectively extend from a top of the deck 1 wherein the recess 41 is located between the first protrusion 351 and the second protrusion 352. The first protrusion 351 has a first passage 3512 defined therethrough and the second protrusion 352 has a threaded hole 3522 defined therethrough. A handlebar assembly 2 includes a base member 31 which is engaged with the recess 41 in the deck 1 and pivotally between the first protrusion 351 and the second protrusion 352 by extending a long pin 353 through a hole 3511 in the first protrusion 351, a hole 312 in the base member 31 and a hole 3521 in the second protrusion 352. A retractable handlebar stem rotatably extends through a second passage 311 of the base member 31 and a front wheel 100' is connected to a lower and of the handlebar stem. A handlebar comprising two grip portions 10 is connected to a top of the handlebar stem. The handlebar stem has a first section 32 which extends in the second passage 311 in the base member 31 and a first end of the first section 32 is fixedly connected to a threaded hole 512 in a fork frame 51 to which the front wheel 100' is connected. A section end of the first section 32 has a first threaded portion 321 on an outer periphery thereof and a threaded collar 34 is connected to the first threaded portion 321. Three positioning rings 33 are connected between the threaded collar 34 and a second section 20. A groove 322 is defined in an outer periphery of the base member 31 and the groove 322 is located within the second passage 311 in the base member 31.

Figure 1:
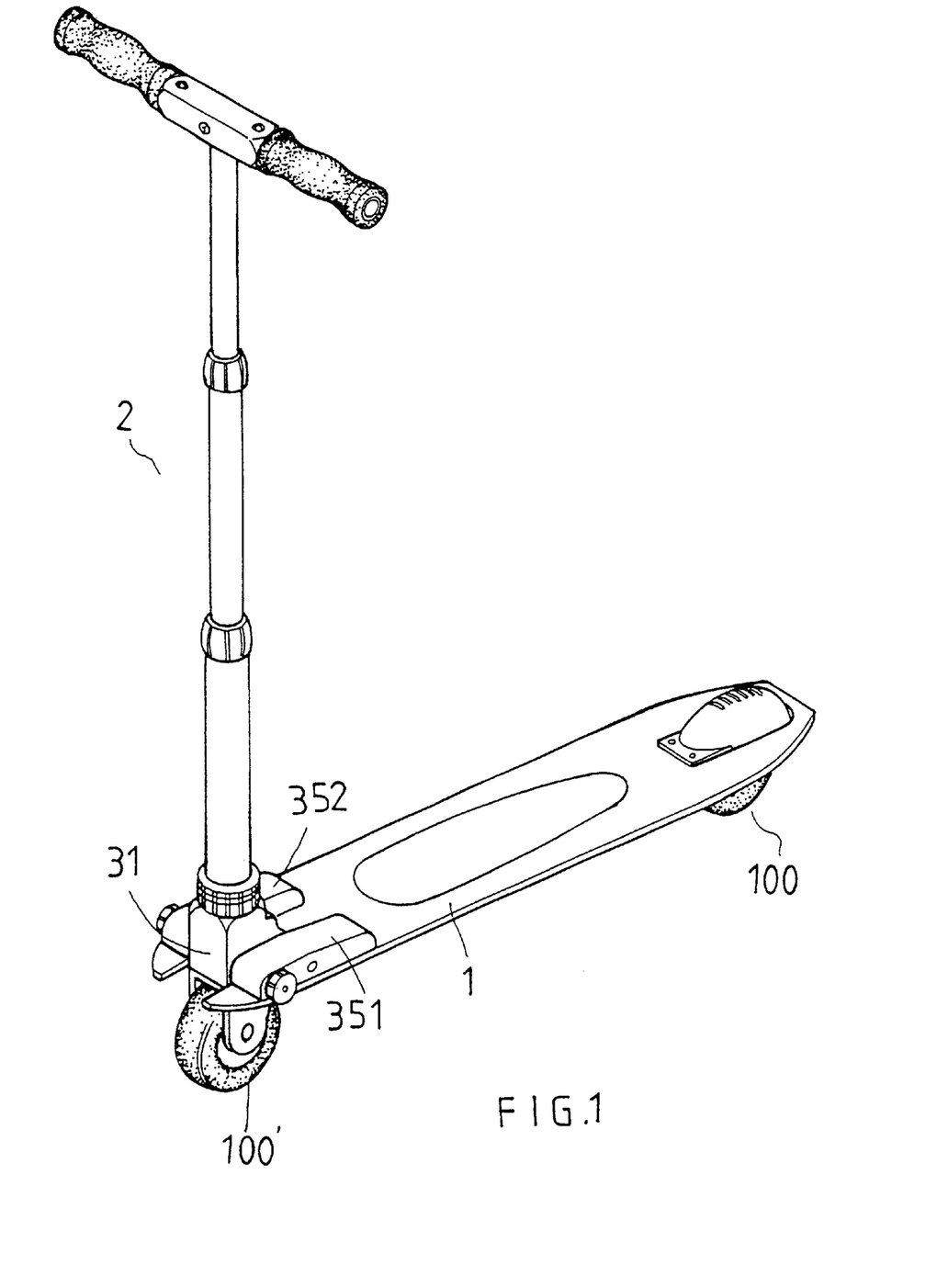
FIG. 1 is a perspective view to show a skating scooter of the present invention.
Figure 2:
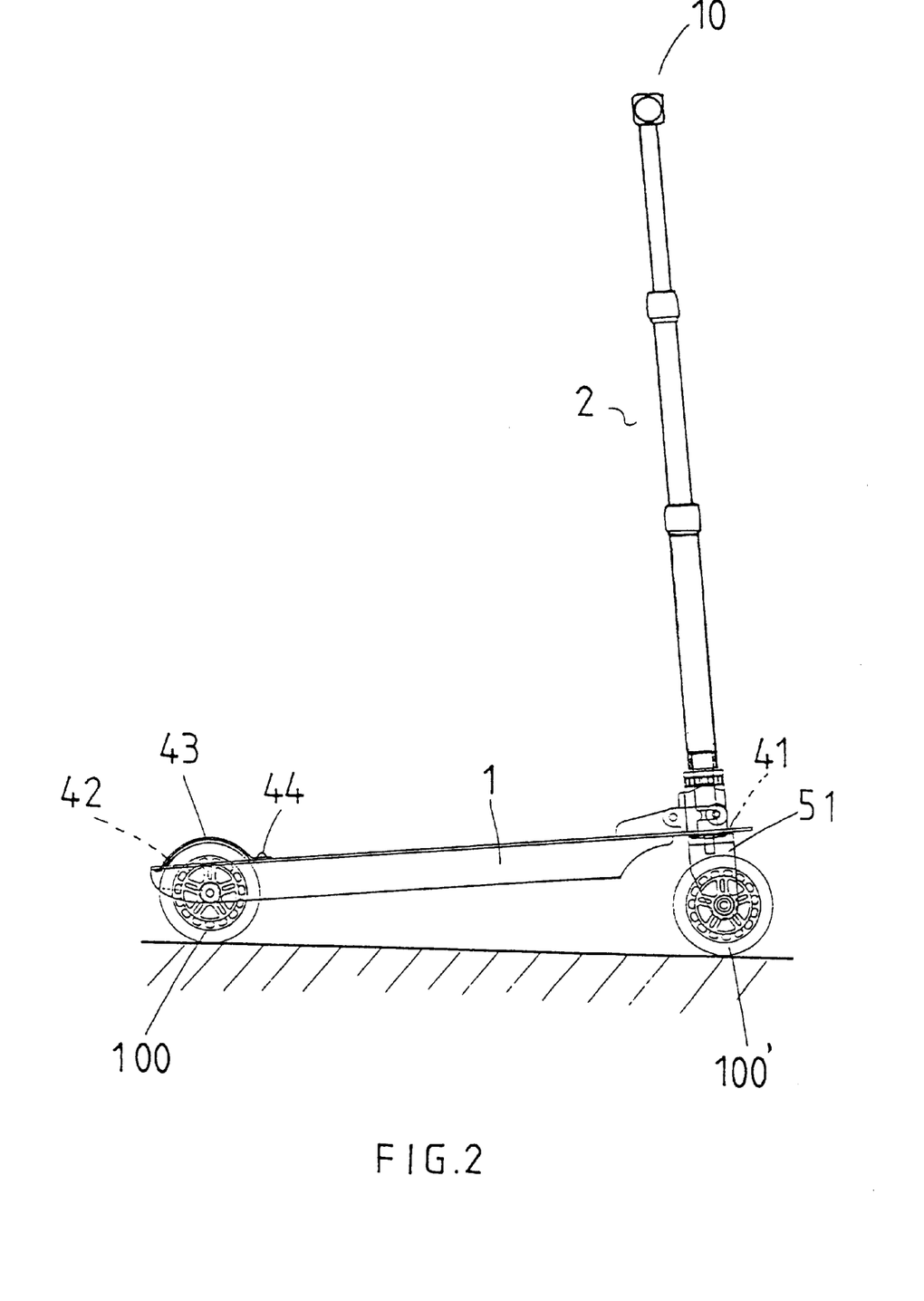
FIG. 2 is a side view to show the skating scooter of the present invention.
Figure 3:
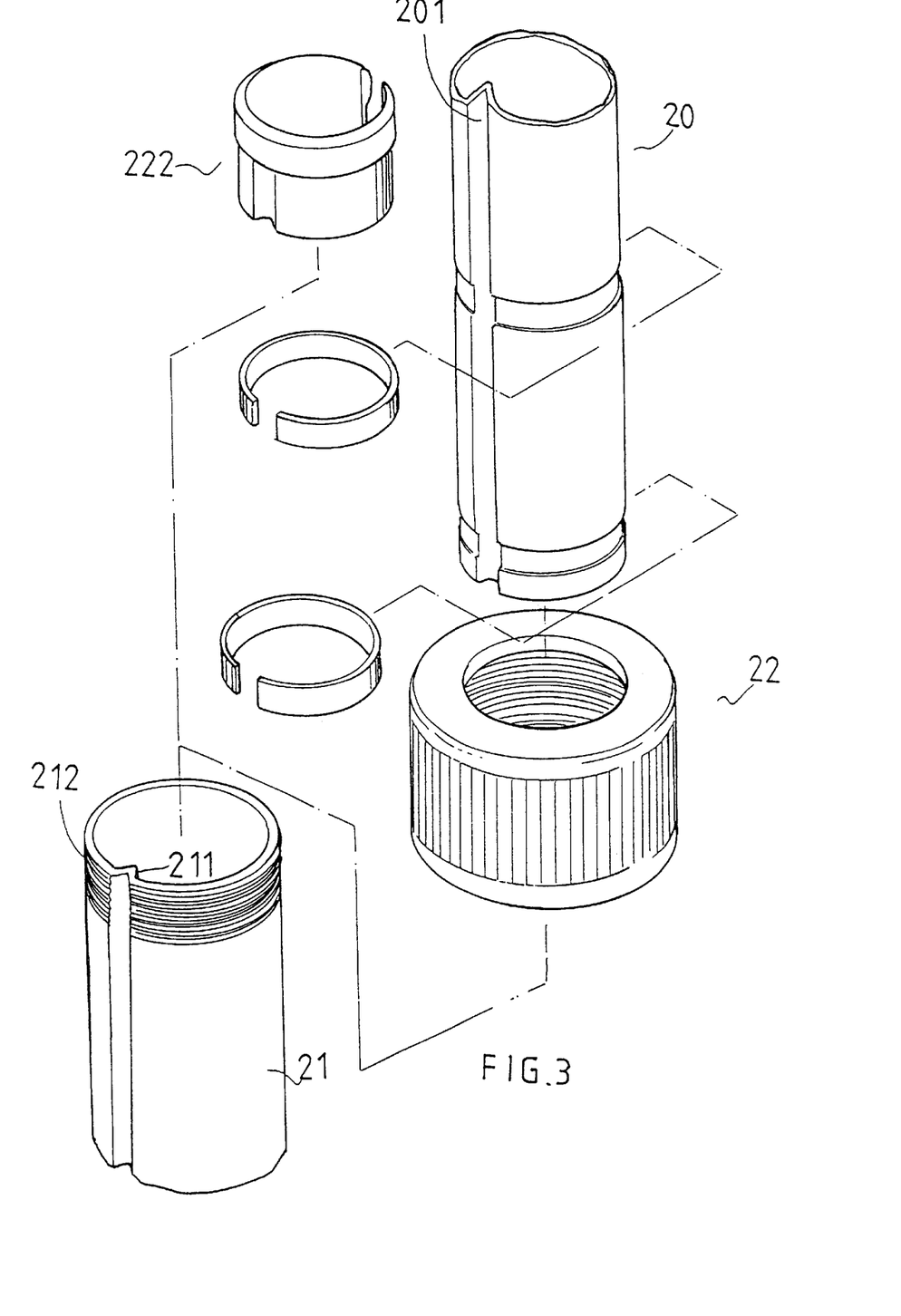
FIG. 3 is an exploded view to show a retractable handlebar stem of the scooter of the present invention.
Figure 4:
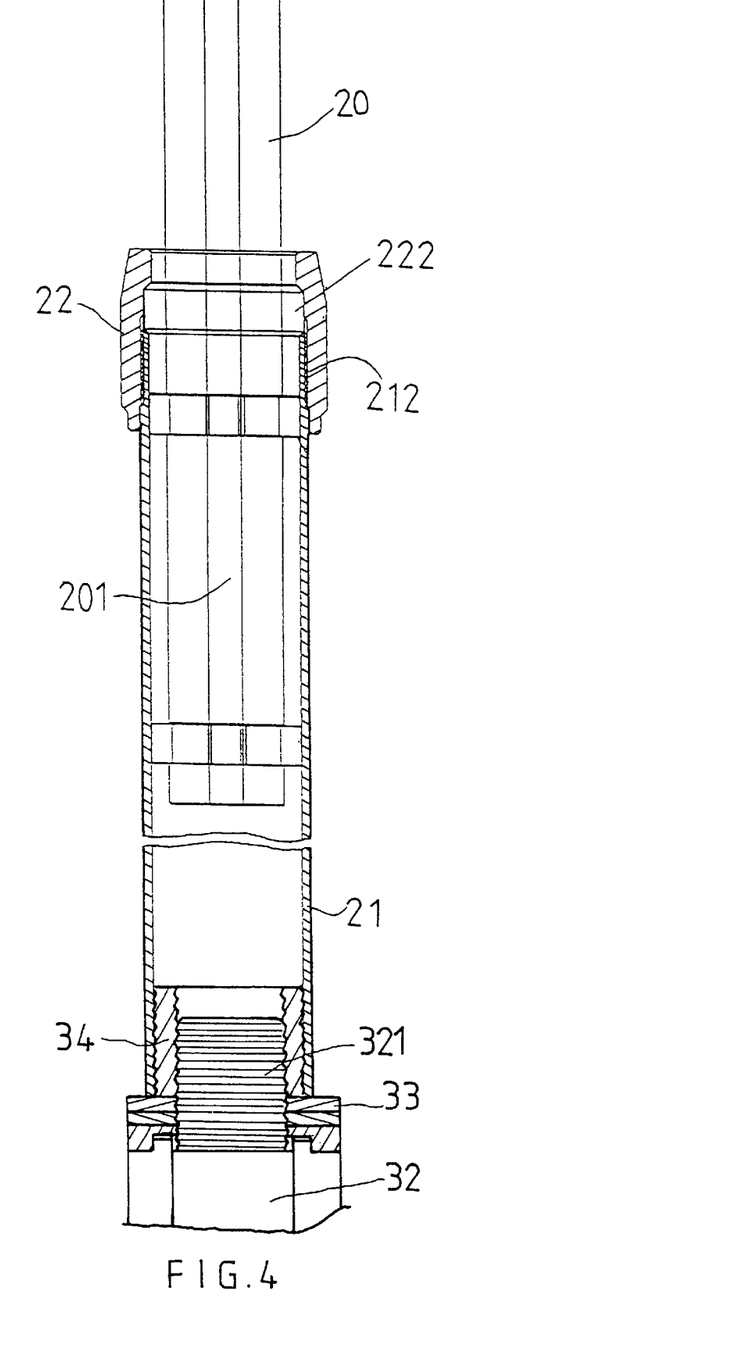
FIG. 4 is a cross section view to show the handlebar stem of the scooter of the present invention.

A third section 20 is retractably received in the second section 21 wherein a longitudinal ridge 211 extends from an inner periphery of the second section 21 and the third section 20 has a longitudinal groove 201 defined in an outer periphery thereof so that the longitudinal ridge 211 is received in the longitudinal groove 201. The second section 21 has a threaded section 212 on an end thereof and a locking ring 22 is mounted to the third section 20 and engaged with the threaded section 212. A C-shaped ring 222 is engaged with the second section 21 and the third section 20 movably extends through the C-shaped ring 222 so that when tightening the locking ring 22, the third section 20 can be clamped by the C-shaped ring 222.

Figure 5:
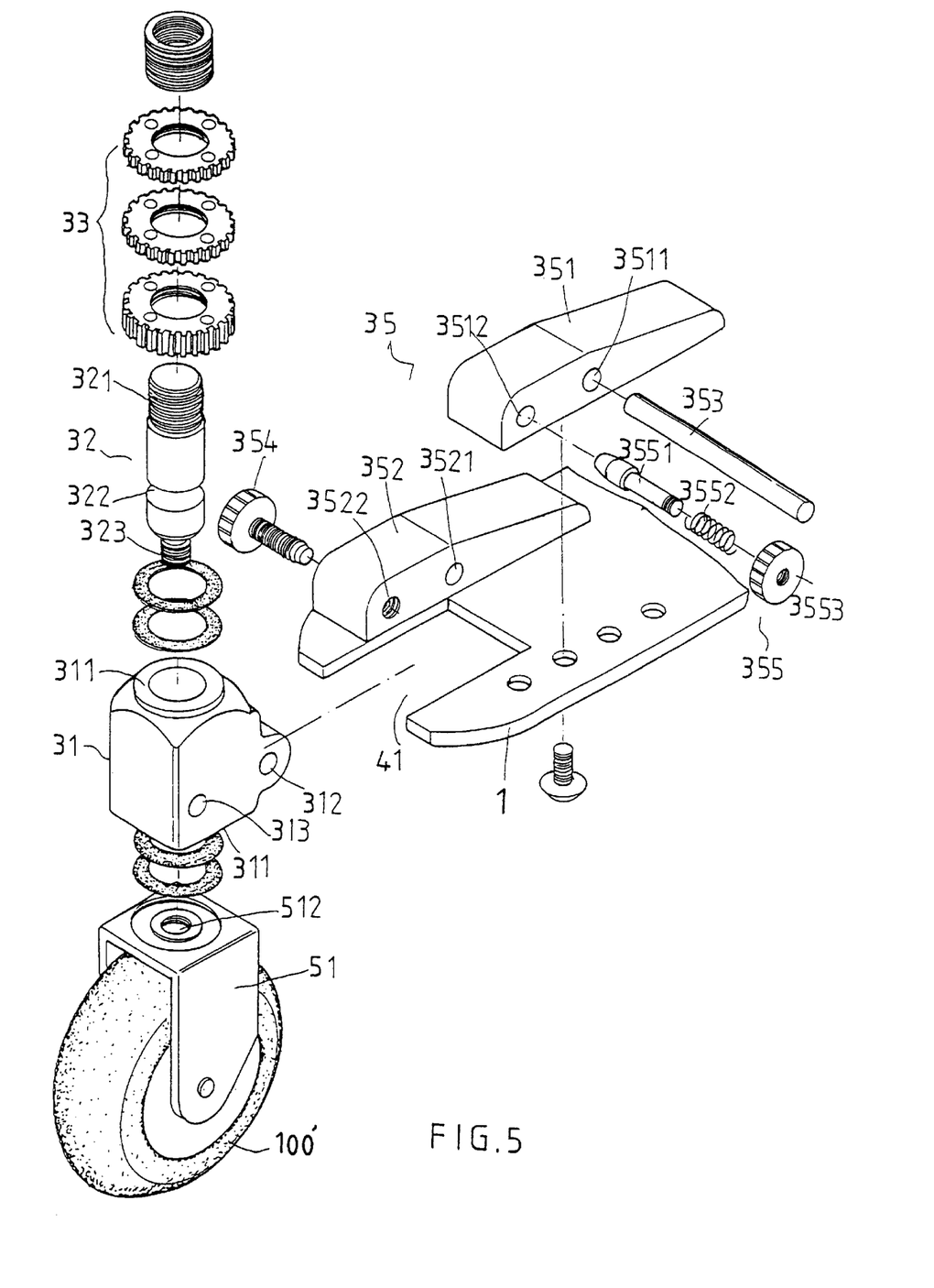
FIG. 5 is an exploded view to show a pivotal mechanism between the deck and the handlebar assembly of the scooter of the present invention.
Figure 6:
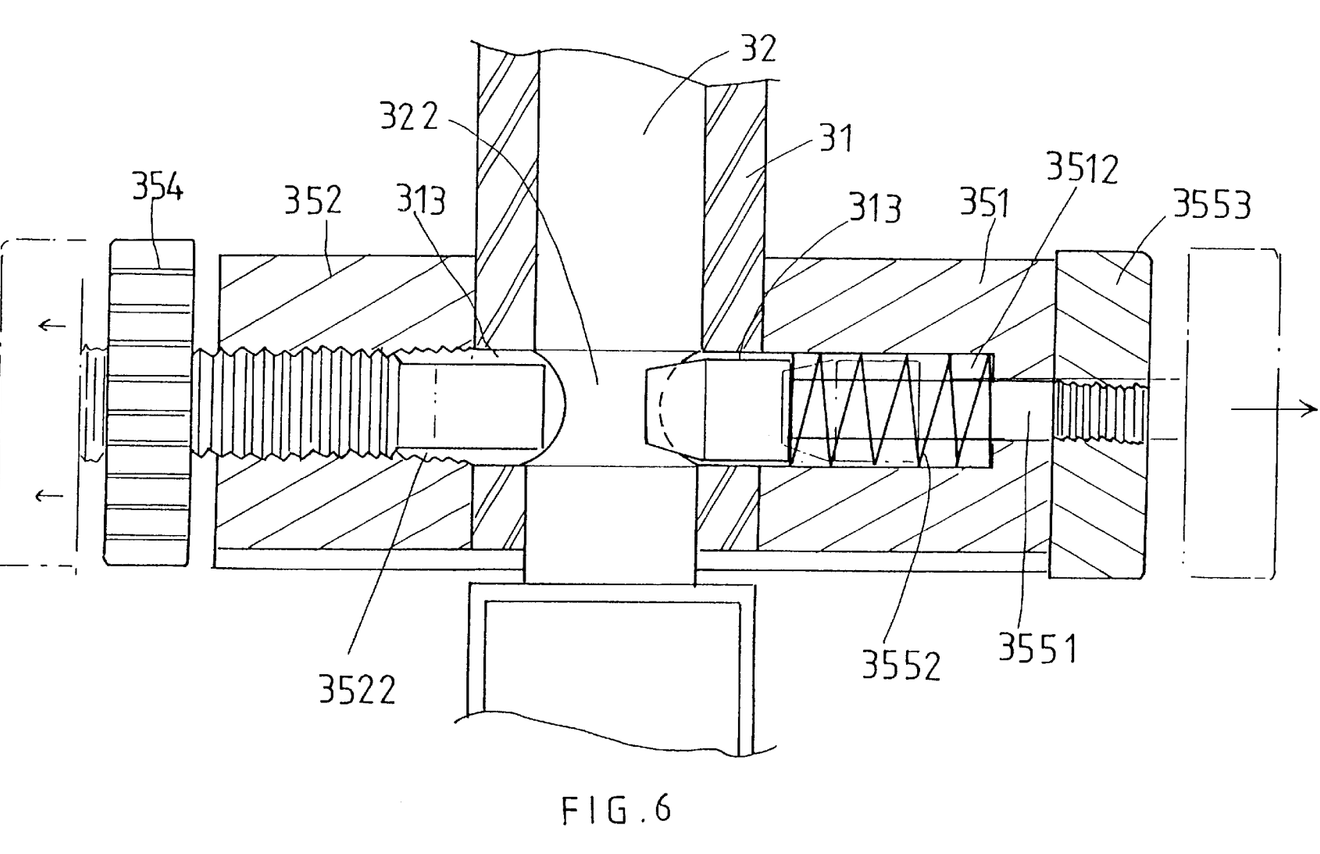
FIG. 6 is a cross sectional view to show the bolt and the pin are respective engaged with a groove of the handlebar stem of the present invention.

Further referring to FIG. 5, a pin 3551 has a head connected to a first end of the pin 3551 and a flange 3553 is connected to a second end of the pin 3551. The pin 3551 is movably inserted into the first passage 3512 and a spring 3552 is mounted to the pin 3551 and biased between the head and the flange 3553. The head of the pin 3551 is engaged with the groove 322 of the first section 32 of the handlebar stem. A bolt 354 is engaged with the threaded hole 3522 and engaged with the groove 322 of the first section 32 of the handlebar stem. Therefore, when pulling the flange 2553, the head of the pin 3551 is disengaged from the groove 322 of the base member 31, and when unthreading the bolt 354, the bolt 354 is removed from the groove 322 of the base member 31. By this way, the handlebar assembly 2 can be pivoted toward the deck 1.

Figure 7:
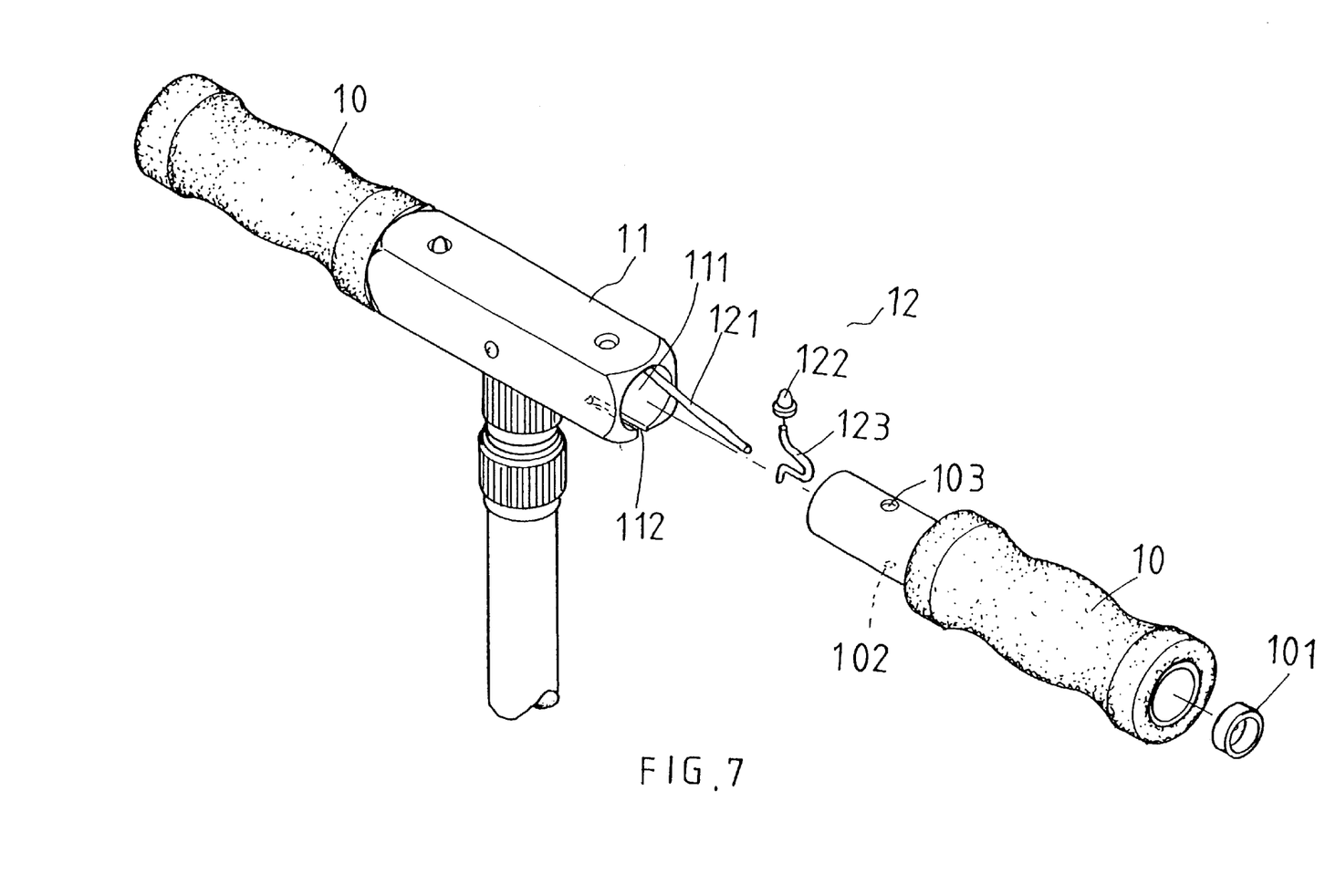
FIG. 7 is an exploded view to show that a handlebar of the present invention comprises two grip portions.
Figure 8:
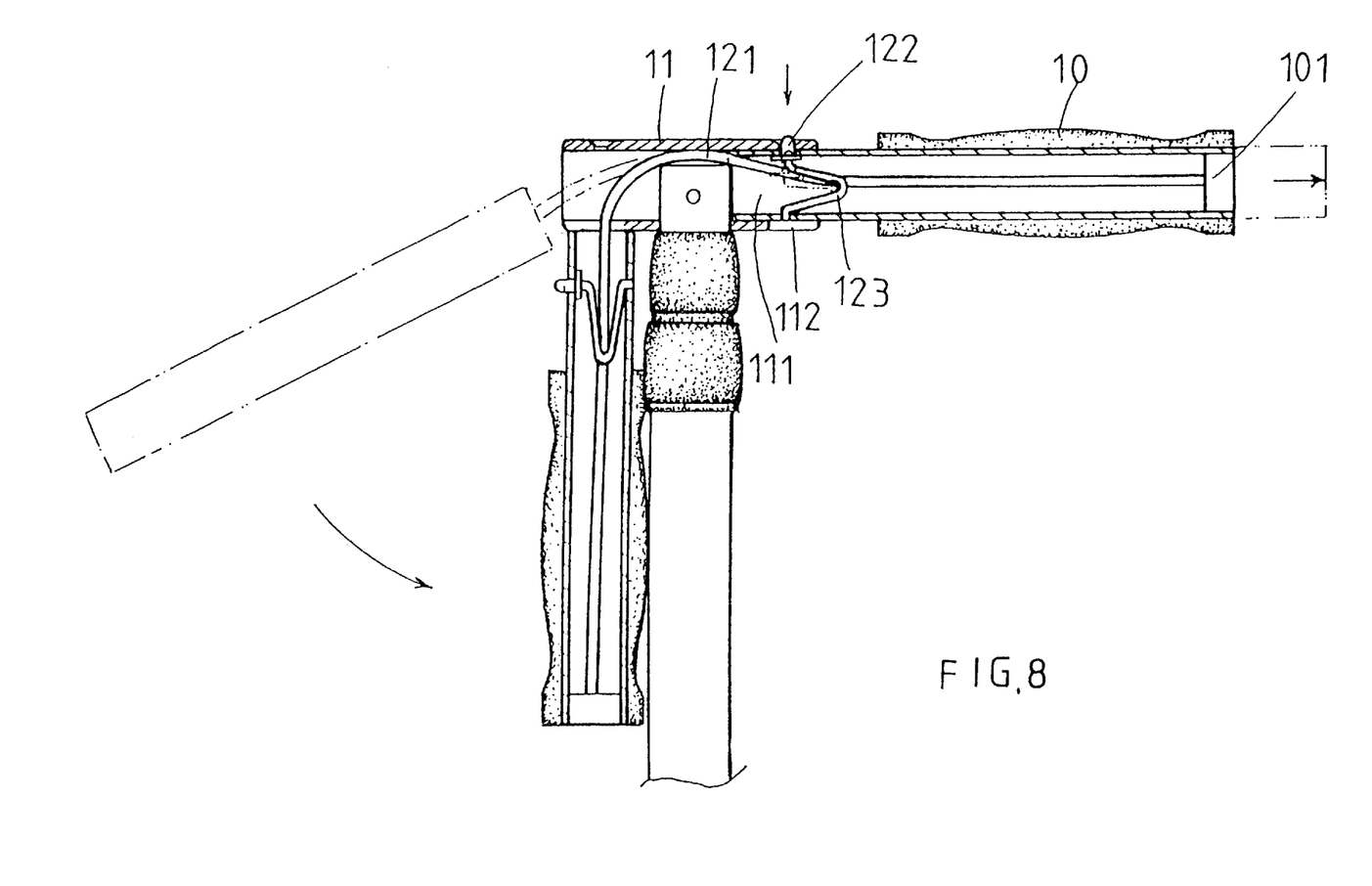
FIG. 8 is a cross sectional view to show the grip portions of the handlebar are foldable.

Referring to FIGS. 7 and 8, the handlebar comprises a connection bar 11 connected to the top of the handlebar stem and a tunnel 111 is defined through the connection bar 11. Two positioning holes 110 are defined through the connection bar 11 and two slits 112 are respectively defined in the two ends of the connection bar 11. The two grip portions 10 each have an insertion section which is engaged with the tunnel 111 of the connection bar 11. Each insertion section has a hole 103 defined therethrough and a positioning member 12 is received in each insertion section. Each positioning member 12 has a bullet head 122 which extends through the hole 103 in the insertion section and the positioning hole 110 in the connection bar 11 to position the grip portions 10. A cable 121 extends through the tunnel 111 and two ends of the cable 121 are respectively fixedly connected to two end caps 101 which are respectively connected to two respective distal ends of the two grip portions 10. The cable 121 is inserted in the two slits 112 when the two grip portions 10 are pivoted.

Figure 9:
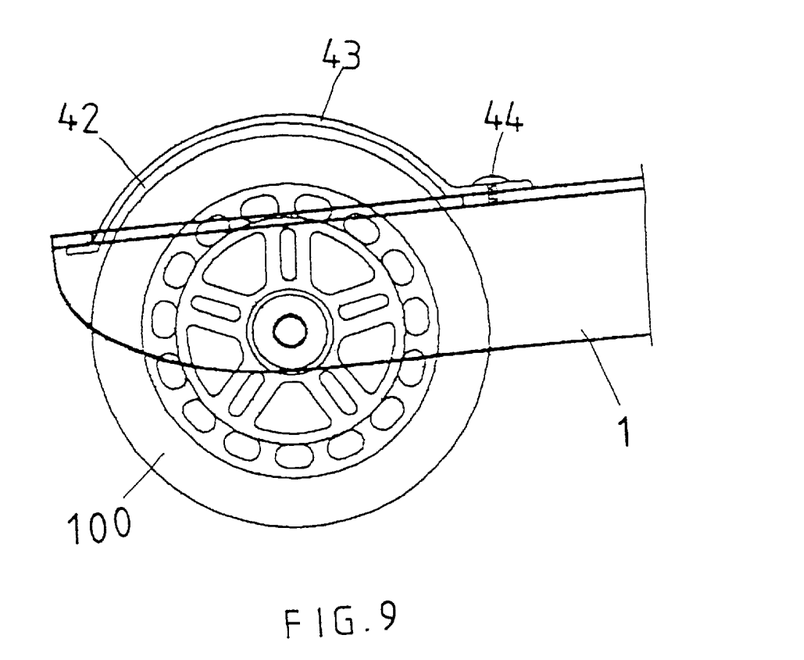
FIG. 9 is an illustrative view to show the position of a brake hoop and a rear wheel of the scooter of the present invention.
Figure 10:
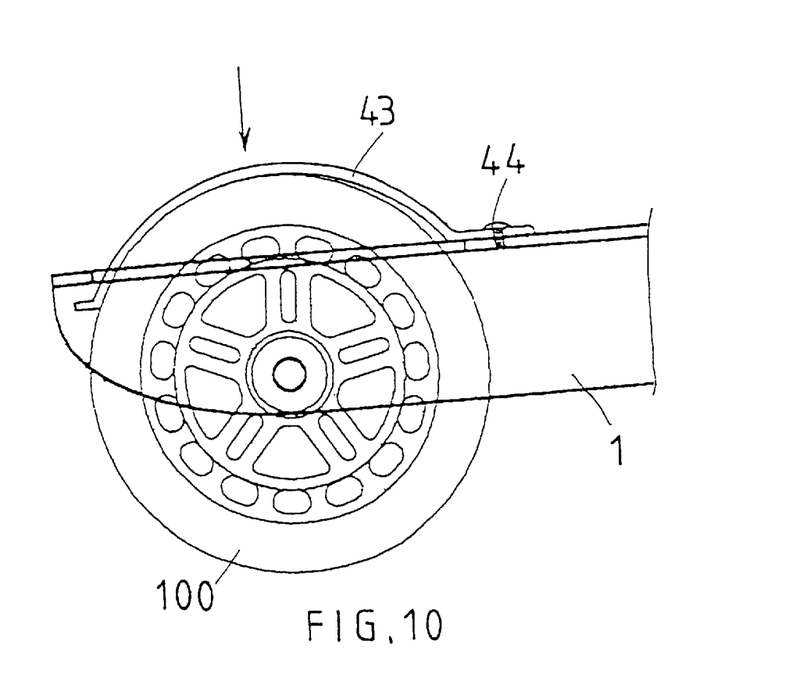
FIG. 10 is an illustrative view to show the rear wheel of the scooter is stopped by steeping down the brake hoop.

Referring to FIGS. 9 and 10, a brake hoop 43 is connected to the rear end of the deck 1 by a bolt 44 and a gap 42 is defined between the brake hoop 43 and the rear wheel 100, and the brake hoop 43 extends above the rear wheel 100. When stepping down the brake hoop 43, the rear wheel 100 is stopped by contacting the brake hoop 43.

The retractable handlebar assembly 2 meets different requirements of users and the foldable grip portions 10 effectively reduce the space it occupies when the handlebar assembly is folded. The bolt 354 ensures that the handlebar assembly 2 will not suddenly collapse because unintentional touch or vibration.

While we have shown and described various embodiments in accordance with the present invention, it should be clear to those skilled in the art that further embodiments may be made without departing from the scope and spirit of the present invention.

What is claimed is:

1. A skating scooter comprising:

a deck having a rear wheel connected to a rear end of said deck and a recess defined in a front end of said deck, a first protrusion and a second protrusion respectively extending from a top of said deck and said recess located between said first protrusion and said second protrusion, said first protrusion having a first passage defined therethrough and said second protrusion having a threaded hole defined therethrough;

a handlebar assembly having a base member which is engaged with said recess in said deck and pivotally between said first protrusion and said second protrusion, a retractable handlebar stem rotatably extending through a second passage of said base member and a front wheel connected to a lower end of said handlebar stem, a handlebar comprising two grip portions being connected to a top of said handlebar stem, said handlebar stem having a groove defined in an outer periphery thereof and said groove located within said second passage in said base member, and a pin movably inserted into said first passage and a head connected to a first end of said pin and a flange connected to a second end of said pin, a spring mounted to said pin and biased between said head and said flange, said head of said pin engaged with said groove of said handlebar stem, a bolt engaged with said threaded hole and engaged with said groove of said handlebar stem.

2. The scooter as claimed in claim 1, wherein said handlebar stem includes a first section which extends in said second passage in said base member and has a first threaded portion on an outer periphery of said first section, a second section retractably received in a second section and a locking ring mounted to said third section and engaged with a threaded section.

3. The scooter as claimed in claim 2 further comprising a longitudinal ridge extending from an inner periphery of said second section and said third section having a longitudinal groove defined in an outer periphery thereof, said longitudinal ridge received in said longitudinal groove.

4. The scooter as claimed in claim 1, wherein said handlebar comprises a connection bar connected to said top of said handlebar stem and a tunnel defined through said connection bar, two positioning holes defined through said connection bar, two slits respectively defined in said two ends of said connection bar, said two grip portions each having an insertion section which is engaged with said tunnel of said connection bar, each insertion section having a hole defined therethrough and a positioning member received in each of said insertion sections, each positioning member having a bullet head which extends through said hole in said insertion section and said positioning hole in said connection bar, a cable extending through said tunnel and two ends of said cable fixedly connected to said two grip portions.

5. The scooter as claimed in claim 1 further comprising two end caps respectively connected to two respective distal ends of said two grip portions, said cable is connected between said two end caps.

6. The scooter as claimed in claim 1 further comprising a brake hoop connected to said rear end of said deck and said brake hoop extending above said rear wheel.

7. The scooter as claimed in claim 1 further comprising an aperture defined in said rear end of said deck and said rear wheel engaged with said aperture.

* * * * *